Sept. 9, 1941.   H. R. FIFE   2,255,208
HYDRAULIC BRAKE FLUID
Filed April 15, 1939
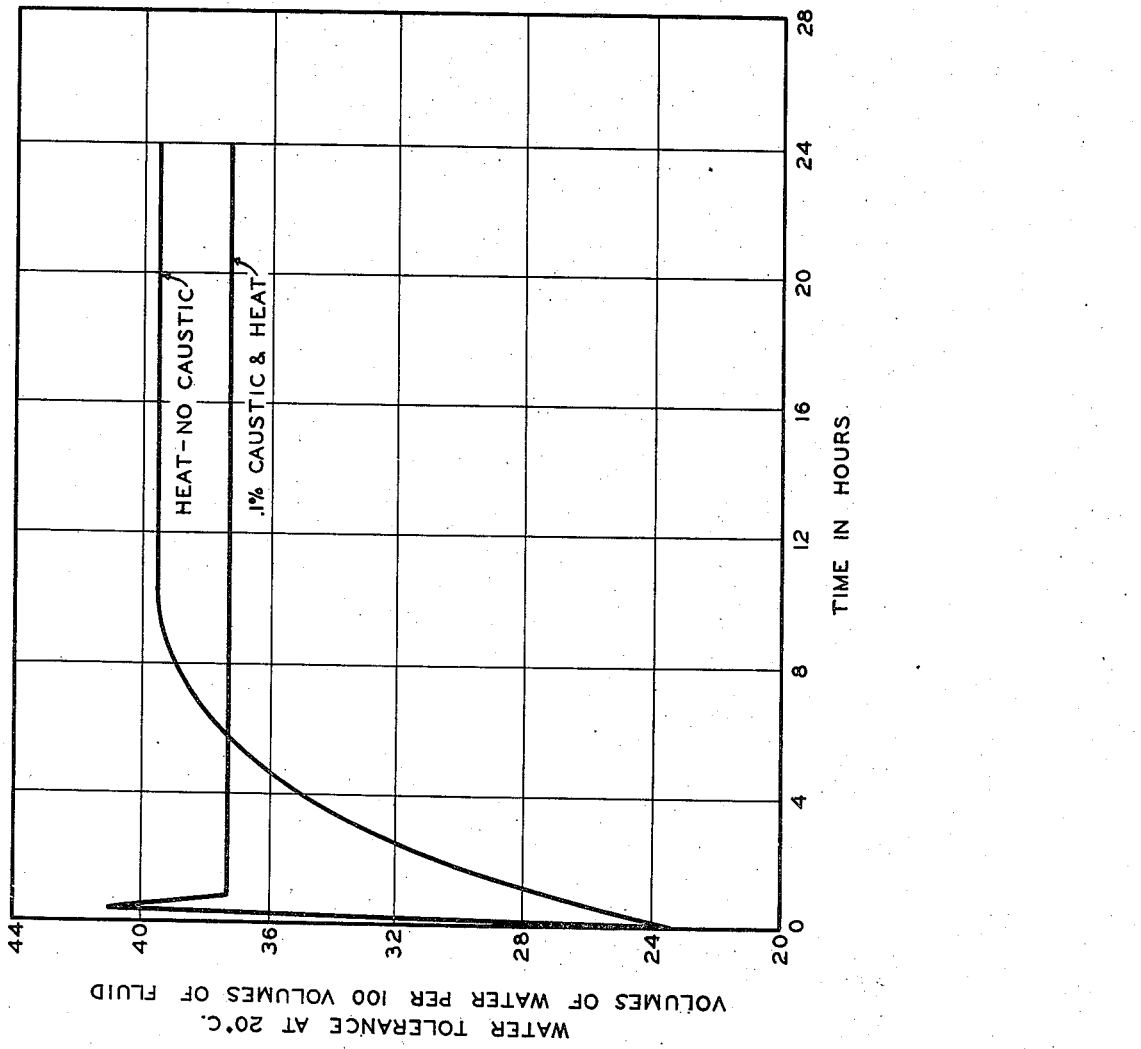
INVENTOR
HARVEY R. FIFE
BY
*Ed Greenewald*
ATTORNEY Patented Sept. 9, 1941

2,255,208

UNITED STATES PATENT OFFICE 2,255,208

HYDRAULIC BRAKE FLUID

Harvey R. Fife, Mount Lebanon, Pa., assignor to Carbide and Carbon Chemicals Corporation, a corporation of New York Application April 15, 1939, Serial No. 268,100

7 Claims. (Cl. 252—79)

This invention is concerned with improvements in hydraulic brake fluids and it is particularly directed to making improved substances to use as the lubricating elements of these fluids. This application is a continuation-in-part of my copending application Serial No. 111,682, filed November 19, 1936, now Patent No. 2,200,494, issued May 14, 1940.

It is essential that a brake fluid contain a lubricating element to insure proper operation of the moving parts of the system. However, all known hydraulic brake systems contain rubber parts as essential parts of the system, and the vast majority of both mineral and vegetable lubricating oils are characterized by excessive swelling or solvent action on rubber. This property makes them entirely unsuited for use in brake fluids. Of the lubricating oils, castor oil is practically the only oil which is sufficiently inert toward rubber to permit its use in brake fluids. Unfortunately, castor oil alone cannot be used as a hydraulic brake fluid because it possesses a relatively high freezing point and congeals at temperatures normally encountered in the operation of the brake system.

Consequently, it is necessary to add diluents to the castor oil in order to reduce its viscosity to working limits at low temperatures. Among the requisites for such diluents are that the diluent is sufficiently non-volatile; that it does not vaporize unduly at the highest temperatures encountered in the operation of the brake system; that it be non-corrosive to aluminum and other metals used in constructing the brake system; and that it does not exert an excessive swelling action on rubber. However, many diluents are known which fulfill these requirements, and yet they fail to meet the primary requisite for such diluents namely, miscibility with castor oil, particularly at low temperatures. Thus, a disadvantageous characteristic of castor oil in brake fluids is its relative lack of miscibility with diluents, especially at low temperatures. Such low temperature separation of the components of brake fluids is very undesirable because a free castor oil phase is formed and the castor oil may congeal at temperatures usually encountered in the operation of a brake system.

Another disadvantage of the present brake fluids containing castor oil is that, upon absorption of small amounts of water, either accidentally or promoted by any hygroscopicity of the diluent, the fluids have a tendency to separate into a castor oil phase and a diluent phase, a tendency which is also accentuated at low temperatures. In such case the separated castor oil phase may congeal.

The object of the present invention is to correct such disadvantageous features accompanying the use of castor oil in brake fluids as are outlined above and yet retain all the present desirable characteristics of castor oil, such as its lubricity and its low swelling action for rubber.

It has been found that this object can be successfully achieved by appropriate chemical modification of castor oil. This chemical modification comprises reacting castor oil, by heating it in the presence of a substantially non-volatile alkaline catalyst, with a substantial excess of polypropylene glycol above that stoichiometrically required to form the monoricinoleate ester of the polyglycol by complete radical interchange with the glyceryl triricinoleate constituent of the castor oil. It is an important feature of this invention that unreacted polypropylene glycol resulting from the use of such excess, which must also be sufficient to make up for polypropylene glycol consumed in any incidental side reaction, is retained as a miscible constituent of the reaction products. It has been found that such a mixture is particularly desirable as the lubricating element of hydraulic brake fluid. The polypropylene glycol used in this invention may be prepared by the reaction of propylene oxide with propylene glycol and may consist of substantially 95% dipropylene glycol, the remainder being higher homologs of dipropylene glycol. The term "polypropylene glycol," as used in the specification and claims, is intended to include such mixtures.

It is acknowledged that the use of ricinoleate esters of glycerine and glycols in brake fluids has previously been suggested. The distinguishing attribute of this invention is that a homogeneous mixture of the reacted and modified castor oil with the excess polypropylene glycol is employed as the lubricating element of the brake fluid. It has been found that when castor oil is modified by heating with an excess of such substances as ethylene glycol, glycerine or diethylene glycol, the resulting reaction products, are not miscible, especially at low temperatures. This effect, in contrast to that obtained in the present invention, may be illustrated, in part, by the following example:

Example I

A sample of castor oil was reacted in the presence of 0.2% by weight of a 50% solution of caustic soda at a temperature of 200° C. with equal proportions by weight of (1) glycerine, (2) ethylene glycol, and (3) polypropylene glycol. In each case, the polyhydroxy substance was present in excess of that stoichiometrically required to form its monoricinoleate ester. The resulting reaction products were compounded in equal proportions by weight with each of three diluents, as shown. Water, in amounts shown below, was then added and the separation temperature of the different fluids determined. The separation temperature is obtained by cooling the fluid from a temperature at which the fluid is homogeneous to the point at which the components begin to separate. This point is detected by the appearance of cloudiness in the fluid. Since it is requisite in a brake fluid that its separation temperature, even in the presence of water, be below minimum operating temperatures normally encountered, this test is determinative of one of the most vital characteristics of the fluids. The separation temperature of the different fluids was as follows:

Table A

| Castor oil reacted with excess | Separation temperature, ° C., diluent—diacetone alcohol, added water, percent | | | | |
|---|---|---|---|---|---|
| | 0 | 1 | 2 | 3 | 4 |
| 1  Glycerine | +153 | | | | |
| 2  Ethylene glycol | −13 | −12 | −12 | −11 | −9 |
| 3  Polypropylene glycol | −35 | −35 | −33 | −33 | −30 |

| Castor oil reacted with excess | Separation temperature, ° C., diluent—ethylene glycol monoethyl ether, added water, percent | | | | |
|---|---|---|---|---|---|
| | 0 | 1 | 2 | 3 | 4 |
| 1  Glycerine | +108 | | | | |
| 2  Ethylene glycol | −16 | −14 | −12 | −12 | −10 |
| 3  Polypropylene glycol | −30 | −30 | −30 | −28 | −28 |

| Castor oil reacted with excess | Separation temperature, ° C., diluent—butanol, added water, percent | | | | |
|---|---|---|---|---|---|
| | 0 | 1 | 2 | 3 | 4 |
| 1  Glycerine | +73.5 | | | | |
| 2  Ethylene glycol | −18.5 | −18 | −18 | −16 | −16 |
| 3  Polypropylene glycol | −45 | −45 | −42 | −42 | −40 |

In each of the cases marked 1 and 2 above, high separation temperatures are obtained apparently because the ricinoleate ester formed is only partially miscible with the unreacted glycerine or ethylene glycol.

Further experiments have also shown the desirability of using an excess polypropylene glycol to react with the castor oil. The results of these experiments are presented in tabulated form below. The reaction mixtures were prepared by following the procedure specified precedingly. By using an excess of the polypropylene glycol, the objects of this invention are more satisfactorily achieved, as is illustrated by the improved miscibility of the lubricating element with diluents when an excess polypropylene glycol is used.

Table B

| Added diluent, percent of total fluid by volume | Excess polypropylene glycol used, 1 part polypropylene glycol, 1 part castor oil by volume | No excess polypropylene glycol used, 1 part polypropylene glycol, 3 parts castor oil by volume |
|---|---|---|
| Glycerine: 9% | Miscible | Immiscible. |
| Ethylene glycol: | | |
| 9% | do | Miscible. |
| 17% | do | Immiscible. |
| 23% | do | Do. |
| Diethylene glycol: | | |
| 9% | do | Miscible. |
| 17% | do | Do. |
| 23% | do | Do. |
| 29% | do | Do. |
| 33% | do | Do. |
| 37% | do | Immiscible. |
| 41% to 50% | do | Do. |

*Example II*

The value of the present invention in increasing the tolerance of brake fluids for water without separation of the components may be better understood by reference to the attached drawing. The composition of the original fluid by volume was castor oil, 15 parts; propylene glycol 15 parts; polypropylene glycol, 15 parts; butanol, 55 parts. Its water tolerance was 23.8 expressed in volumes of water absorbed without separation of the components per 100 volumes of fluid tested. Since both propylene and polypropylene glycol are quite hygroscopic, the fluid has a tendency to absorb water, which may cause separation and it is therefore essential that the fluid have high water tolerance.

The polypropylene glycol and the castor oil, in the same amounts as above, were then reacted together but separate from the other ingredients at about 200° C. for the times shown in the drawing and both with and without the presence of caustic soda as a catalyst. The reaction products were then diluted with the same amounts of butanol and propylene glycol as above and the separation temperature determined. The results as set forth graphically in the drawing, show the pronounced increase in water tolerance obtained in both instances. However, the time required for reaction is excessive when a catalyst, such as caustic soda, is not used.

The reaction products, when caustic soda was employed, were believed principally to consist of polypropylene glycol mono-ricinoleate, unreacted polypropylene glycol, and small amounts of sodium ricinoleate and free glycerine. In this instance the amount of polypropylene glycol present was about two times as much as that stoichiometrically required to form its monoricinoleate ester.

The reaction product of the castor oil with the excess polypropylene glycol is also characterized by greatly increased miscibility with diluents as compared with castor oil itself. This increased miscibility with a variety of diluents is a very important improvement, especially from a practical viewpoint, because a number of different brake fluids are available and are very likely to become intermixed during refilling of a given hydraulic brake system. The increased miscibility of the new fluid lessens the danger that separation of the components of the fluids would occur on such intermixing.

The following table shows the improved miscibility at ordinary temperatures and at low temperatures of the new lubricating element with diluents as compared to unreacted mixtures of castor oil and polypropylene glycol. The reacted mixture was prepared by following the procedure specified in Example I.

Table C

| Added diluent, percent of total fluid by volume | Reacted mixture | Unreacted mixtures | |
|---|---|---|---|
| | A<br>1 part polypropylene glycol and 1 part castor oil by volume | B<br>1 part polypropylene glycol and 1 part castor oil by by volume | C<br>1 part polypropylene glycol and 3 parts castor oil by by volume |
| Glycerine: 9% | Miscible | Immiscible | Immiscible. |
| Ethylene glycol: | | | |
| 9% | do | Miscible | Do. |
| 17% | do | Immiscible | Do. |
| 23% | do | do | Do. |
| 29% | Miscible at 41° C. and up. | do | Do. |
| Diethylene glycol: | | | |
| 9% | Miscible | Miscible | Miscible. |
| 17% | do | do | Immiscible. |
| 23% | do | do | Do. |
| 29% | do | Immiscible | Do. |
| 33% | do | do | Do. |
| 37% | do | do | Do. |
| 41% to 50% | do | do | Do. |
| 53% | Miscible at 32° C. and up. | do | Do. |
| Methyl ether of diethylene glycol: | | | |
| 50% | Miscible at temperatures above −38° C. | Immiscible at temperatures below −23° C. | Immiscible at temperatures below −4° C. |

A wide range of diluents may thus be employed with the new lubricating element. As examples may be mentioned butanol, secondary butyl alcohol, tertiary butyl alcohol, the methyl, ethyl and butyl monoethers of ethylene glycol and of propylene glycol.

Another outstanding advantage of the new lubricating element is its lower viscosity at reduced temperatures as compared to castor oil alone or simple mixtures of castor oil and polypropylene glycol. The lubricating element of this invention is also characterized by improved chemical stability in service. For instance, castor oil is unstable in service in the presence of sodium ricinoleate, since it tends to decompose and form carbon dioxide, whereas the new fluid is extremely stable in the presence of this salt and it is not necessary to remove it from the reaction products before use. Finally, the lubricating element of this invention is substantially as inert toward rubber as is castor oil and it does not promote corrosion of the metallic parts of the system nor does it separate from diluents at temperatures above zero Fahrenheit in any case.

Further examples to illustrate the manner of making the improved lubricating element will now be given.

*Example III*

A mixture consisting of 31% by weight of castor oil, 67% by weight of a mixture of polypropylene glycols consisting of dipropylene glycol and a small amount of its higher homologs, and 0.2% by weight of a 36% aqueous solution of sodium hydroxide was heated for about 2 hours at a temperature of about 200° C. In this case the polypropylene glycols present were about five times the amount stoichiometrically required to form the mono-ricinoleate ester of the respective polyglycols.

After cooling, 66 parts by weight of the modified and homogeneous oil were mixed with 34 parts by weight of butanol in order to form a fluid suitable for use in hydraulic brake fluids. The new fluid possessed a water tolerance of 38 volumes of water per 100 volumes of fluid, whereas a fluid of the same empirical composition which had not received the heat treatment described had a water tolerance of only 11 in the same units. In other respects, the new fluid showed operating features decidedly superior to the unreacted fluid of the same empirical composition and to many fluids now in use.

The exact conditions specified in the above example, may, of course, be varied. For instance, other substantially non-volatile alkaline catalysts, such as potassium hydroxide and triethanolamine, may be used. Also, as shown in the drawing, the catalyst may be omitted although longer reaction times are then required. When a catalyst is used, the temperature may be widely varied from about 70° C. to about 300° C. depending largely on the time of heating.

In carrying out the reaction between castor oil and the excess polypropylene glycol, it is desirable to observe certain precautions. For instance, the caustic should be added slowly and uniformly with vigorous agitation. Otherwise, the caustic solution separates to the bottom of the reaction vessel and solid sodium ricinoleate is deposited. This is undesirable and promotes discoloration and high alkalinity in the reaction products. The pH of the reaction products produced under these conditions may be as high as 9 and this is sometimes sufficient to cause severe alkaline corrosion of the aluminum pistons in the brake system. In contrast, by using vigorous agitation and slow addition of the caustic, a pH as low as 7.4 to 7.8 may be obtained and the possibility of alkaline corrosion by the fluid thus avoided.

In addition, it is desirable to use several times the amount of caustic required for neutralization of the free fatty acid contained in the castor oil. The excess caustic serves as a catalyst and also produces an equivalent amount of sodium ricinoleate which acts as a buffer salt in maintaining the proper alkalinity to avoid corrosion. Consequently, the use of a corrosion inhibitor with the new fluid is not essential. It is also desirable to carry out the reaction in the absence of air and in a closed system.

*Example IV*

Following these precautions, a large scale experiment was conducted in which 15 parts by volume of castor oil and 15 parts by volume of polypropylene glycol were reacted by pumping the reactants through a heating coil. Uniform heating was carried out at a temperature within the range of 160° to 215° C. and for a period of about 45 minutes.

On cooling, the reaction products were mixed with 55 parts of butanol and 15 parts of propylene glycol, all by volume. This fluid was not discolored; it had a pH range of 7.4 to 8.2; and a water tolerance of 38 to 44 volumes per 100 volumes of fluid. The separation temperature of the fluid was far below zero Fahrenheit, the actual test value being −60° F. After a year's service, this fluid had caused no corrosion, did not gum, maintained a pH range of 7.4 to 8.2, and retained its high water tolerance; and the original separation temperature remained unchanged.

Other modifications of the invention other than those disclosed will be readily apparent to those skilled in the art and are intended to be included within the invention as defined by the appended claims.

I claim:

1. In a hydraulic brake fluid, a homogeneous lubricating element comprising polypropylene glycol mono-ricinoleate and polypropylene glycol.

2. In a hydraulic brake fluid, a homogeneous lubricating element comprising polypropylene glycol and the polypropylene glycol mono-esters of the fatty acids derived from castor oil.

3. A hydraulic brake fluid comprising a homogeneous mixture of polypropylene glycol mono-ricinoleate and polypropylene glycol, as a lubricating element, combined with an organic liquid diluent.

4. A hydraulic brake fluid comprising a lubricating element and an organic liquid diluent, said lubricating element being a homogeneous mixture of polypropylene glycol and an ester exchange product of castor oil and polypropylene glycol containing polypropylene glycol mono-ricinoleate.

5. A hydraulic brake fluid comprising a lubricating element, which comprises a homogeneous mixture of polypropylene glycol mono-ricinoleate and polypropylene glycol, combined with a diluent of the group of aliphatic alcohols and monoalkyl ethers of alkylene and polyalkylene glycols.

6. A hydraulic brake fluid comprising a homogeneous mixture of polypropylene glycol mono-ricinoleate and polypropylene glycol, as a lubricating element, combined with an organic liquid diluent; said polypropylene glycol in each instance being substantially identical with that resulting from the reaction of propylene glycol with propylene oxide.

7. A hydraulic brake fluid comprising, by volume, about six parts of a homogeneous mixture of polypropylene glycol with the polypropylene glycol mono-esters of the fatty acids derived from castor oil, about three parts of monopropylene glycol, and about eleven parts of butanol.

HARVEY R. FIFE.